(12) United States Patent
Chung

(10) Patent No.: US 11,311,148 B2
(45) Date of Patent: Apr. 26, 2022

(54) STORAGE CONTAINER FOR VACUUM BLENDER WITH BACKFLOW PREVENTION FUNCTION

(71) Applicant: CTMC CO., LTD., Ansan-si (KR)

(72) Inventor: Myoung Hwa Chung, Suwon-si (KR)

( * ) Notice: Subject to any disclaimer, the term of this patent is extended or adjusted under 35 U.S.C. 154(b) by 188 days.

(21) Appl. No.: 16/639,326

(22) PCT Filed: Aug. 8, 2018

(86) PCT No.: PCT/KR2018/009009
§ 371 (c)(1),
(2) Date: Feb. 14, 2020

(87) PCT Pub. No.: WO2019/035592
PCT Pub. Date: Feb. 21, 2019

(65) Prior Publication Data
US 2021/0022556 A1 Jan. 28, 2021

(30) Foreign Application Priority Data
Aug. 18, 2017 (KR) .......................... 10-2017-0104931

(51) Int. Cl.
*A47J 43/07* (2006.01)
*A47J 43/046* (2006.01)
(Continued)

(52) U.S. Cl.
CPC ......... *A47J 43/0716* (2013.01); *A47J 43/046* (2013.01); *B01F 33/70* (2022.01);
(Continued)

(58) Field of Classification Search
CPC .... A47J 27/04; A47J 43/0772; A47J 43/0716; B01F 15/00993; B01F 33/70
See application file for complete search history.

(56) References Cited

U.S. PATENT DOCUMENTS

2015/0201808 A1\* 7/2015 Katsuki ................. A47J 43/046
99/489

FOREIGN PATENT DOCUMENTS

| CN | 2726478 Y | 9/2005 |
| CN | 2920112 Y | 7/2007 |

(Continued)

OTHER PUBLICATIONS

Translation of Iwaki Toshiyuki (WO 2016072203), published May 2016. Translation retrieved Oct. 2021 (Year: 2016).*
(Continued)

*Primary Examiner* — Elizabeth Insler
(74) *Attorney, Agent, or Firm* — Antonio Ha & U.S. Patent, LLC

(57) ABSTRACT

The present invention relates to a storage container used in a vacuum blender capable of processing foodstuffs in a vacuum state, and comprises a container body which has an open upper portion and is provided with an inner space for storing foodstuffs, a sealing lid which covers the upper portion of the container body and has a check valve for blocking air from flowing into the inner space from the outside of the container body in a vacuum state, and a backflow preventing unit which is installed at a lower portion of the sealing lid and has a floating valve member embedded therein to prevent micronized foodstuffs from flowing back out of the sealing lid through the check valve in such a manner that when the micronized foodstuffs rise, the floating valve member rises together by means of buoyancy to hermetically seal an air passage.

8 Claims, 6 Drawing Sheets

(51) Int. Cl.
*B01F 13/06* (2006.01)
*B01F 15/00* (2006.01)
*B01F 33/70* (2022.01)
*B01F 35/45* (2022.01)
B01F 35/30 (2022.01)
B01F 101/00 (2022.01)

(52) U.S. Cl.
CPC ........ *B01F 35/45* (2022.01); *B01F 2035/351* (2022.01); *B01F 2101/1805* (2022.01)

(56) References Cited

FOREIGN PATENT DOCUMENTS

| | | |
|---|---|---|
| CN | 203609273 U | 5/2014 |
| CN | 105902149 A | 8/2016 |
| CN | 105996826 | 10/2016 |
| CN | 106073543 A | 11/2016 |
| CN | 106108596 | 11/2016 |
| JP | 2015-037598 | 2/2015 |
| KR | 10-2009-0068085 | 6/2009 |
| KR | 10-2011-0013638 | 2/2011 |
| KR | 10-2015-0145163 | 12/2015 |
| KR | 10-1673246 | 11/2016 |
| KR | 10-1674164 | 11/2016 |
| KR | 10-1685593 | 12/2016 |
| KR | 20-2016-0004201 | 12/2016 |
| WO | 2016-072203 | 5/2016 |
| WO | WO-2016072203 A1 * | 5/2016 ............ A47J 43/046 |

OTHER PUBLICATIONS

English Specification of 2016-072203
English Specification of 10-1674164.
English Specification of 10-1673246.
English Specification of 10-2015-0145163.
English Specification of 10-1685593.
English Specification of 2015-037598.
English Abstract of 105996826.
English Abstract of 106108596.
English Specification of 20-2016-0004201.
English Specification of CN2726478Y.
English Specification of CN105902149A
English Specification of CN203609273U.
English Specification of CN106073543A.
English Specification of CN2920112Y.
English Specification of 10-2011-0013638.
English Specification of 10-2009-0068085.

* cited by examiner

ND THE VAUCUM BLENDER WITH BACKFLOW PREVENTION FUNCTION

STORAGE CONTAINER FOR VACUUM BLENDER WITH BACKFLOW PREVENTION FUNCTION

TECHNICAL FIELD

The present disclosure relates to a storage container for a vacuum blender having a backflow prevention function, and more particularly, to a storage container for a vacuum blender having a function of preventing food stored in a storage container in a sealing cover covering a vacuum blender container from flowing backward out of the container.

BACKGROUND ART

Blenders, electrical appliances most frequently used in homes today, cut and crush food materials such as fruits, vegetables, grains, and the like using blades rotatably installed at a lower portion of a storage container so as to be ingested.

In a general blender, a food material which is a crush target is put into a storage container, a lid is closed, and blades are rotated by a motor that rotates at a high speed, and in this process, a large amount of bubbles is produced as air in the storage container and grains of the crushed food material are mixed at a high speed. For example, when a fruit such as banana or tomato is put in a blender and crushed, a large amount of bubbles are produced at the top of a fruit juice. The bubbles not only lowers the taste and texture of the fruit juice but also indicates that fruit fibers were already oxidized in the crushing process and nutrients were significantly destroyed.

In addition, in the case of keeping the food material in storage, without being ingested immediately after crushing, if the food material is stored in a state of being exposed in the air, the oxidation process progresses more quickly to accelerate destruction of fibers and nutrients, the food material is discolored to degrade freshness, and delamination occurs between the air and the food material. As such, the food material crushed by the blender had a problem in that it is difficult to store the food material for a long time unless eaten immediately.

In order to solve the problem, a vacuum blender designed to crush a food material in a vacuum state has been developed. The vacuum blender developed by the inventor of the present application is disclosed in Korean Patent Laid-Open Publication No. 2015-0145163 (Entitled "Vacuum blender and method of operating the same") (Patent document 1). This vacuum blender includes a main body provided with an internal space; a mechanical operating part including a vacuum pump and a rotary motor installed in the internal space of the main body; a support configured to allow a vacuum tube connected to the vacuum pump to pass therethrough and to rise from the machine operating part by a predetermined height; a vacuum decompression part provided at an upper portion of the support and having a first vacuum chamber connected to the vacuum tube therein, wherein upper and lower portions of the first vacuum chamber communicate with the outside and the upper portion of the first vacuum chamber is configured to be selectively opened or closed by a first vacuum stopper; a storage container seated on the mechanical operating part, having a second vacuum chamber provided therein, and having a blade connected to the rotary motor; and a vacuum crushing part including a sealing cover sealably covering the storage container and installed to selectively open and close a second vacuum stopper at a portion sealably connected to a lower portion of the first vacuum chamber of the vacuum decompression part.

In the case of using the vacuum blender configured as described above, user convenience may be improved by integrating a vacuum device in a main body of the blender and the storage container may be separated/stored, while maintaining a vacuum state, by dualizing a vacuum space.

However, as a result of actually using the vacuum blender, while putting a liquid food material such as milk in the storage container and removing vacuum, liquid bubbles were produced and flowed backward through the second vacuum stopper mounted on the sealing cover of the storage container. When fine food matters (or micronized foodstuffs) such as bubbles or the like flow backward to the outside of the storage container, the fine food matters may be introduced into an electric component such as the vacuum motor along the vacuum tube to break down the vacuum motor, a vacuum sensor, or the like in a worst-case scenario. Therefore, a method of effectively preventing the phenomenon in which such fine food matters in the storage container flows backward at the time of generating vacuum is required to be developed in order to expand the use of the vacuum blender.

RELATED ART DOCUMENT

Korean Patent Laid-Open Publication No. 2015-0145163 (Entitled Vacuum blender and method of operating the same", dated Dec. 29, 2015, applicant: CTMC Co., Ltd.)

DETAILED DESCRIPTION OF THE INVENTION

Technical Problems

An aspect of the present disclosure provides a storage container for a vacuum blender with a backflow prevention function, in which a floating valve member is installed at a lower portion of a sealing cover covering the storage container for a vacuum blender so that when fine food matters such as bubbles or the like rise in the process of forming vacuum in the storage container, the floating member is raised together by buoyancy to seal an air passage, thereby preventing the fine food matters from flowing backward out of the storage container.

Means to Address the Problems

In an aspect, a storage container for a vacuum blender having a backflow prevention function, which is as a storage container used in a vacuum blender for processing a food material in a vacuum state, includes: a container main body having an open upper portion and having an internal space for holding the food material; a sealing cover covering the upper portion of the container main body and having a check valve installed to block air flowing from outside of the container main body to the internal space in a state where vacuum is formed; and a backflow preventing unit installed at a lower portion of the sealing cover and including a floating valve member raised together by buoyancy when the fine food matters rise to seal an air passage to prevent the fine food matters from flowing backward to the outside of the sealing cover through the check valve.

The backflow preventing unit may be provided such that a valve mounting member having a cup shape with an open upper portion, allowing the floating valve member to be installed to be movable up and down therein, and having a plurality of air inlet holes provided on a bottom thereof may be detachably coupled to a lower portion of the sealing cover, and the floating valve member may include: a lower end buoyancy acting portion allowing buoyancy generated by the fine food matters flowing in through the air inlet holes provided at the bottom of the valve mounting member to act and an upper end valve portion extending upward from the lower end buoyancy acting portion and allowing a valve packing to be inserted and installed therein.

The lower end buoyancy acting portion of the floating valve member may have a rim portion provided along a circumference thereof and having a predetermined thickness, the rim portion may be in contact with a bottom of the valve mounting member to form a buoyancy acting space between the lower end buoyance acting portion and the bottom of the valve mounting member, all air inlet holes provided at the bottom of the valve mounting member may be located on an inner side of the rim portion, and the rim portion may have an air outlet hole allowing air flowing into the buoyancy acting space through the air inlet hole to be discharged to an inside of the cup of the valve mounting member.

The upper end valve portion of the floating valve member may have an inner wall portion having a predetermined height along a circumference thereof, a valve packing may be inserted and installed in an internal mounting space formed by the inner wall portion, and the inner wall portion may move along an air flow guide member provided at a lower end of the sealing cover.

The upper end valve portion of the floating valve member may have a mounting protrusion provided in the internal mounting space formed by the inner wall portion, and the valve packing may be inserted and coupled to the mounting protrusion so as to be fixed.

The air flow guide member may include an inner guide rib and an outer guide rib formed at a predetermined interval therebetween, and the inner wall portion of the floating valve member may be located between the inner guide rib and the outer guide rib to change a flow direction of air.

The air flow guide member may be configured to allow air discharged through the air outlet hole of the lower end buoyancy acting portion of the floating valve member to rise through an air passage between the inner wall portion of the floating valve member and the outer guide rib of the air flow guide member, and the rising air may drop again through the air passage between the inner guide rib of the air flow guide member and the inner wall portion of the floating valve member.

The valve packing inserted and installed in the upper end valve portion of the floating valve member may be brought into contact with the inner guide rib of the air flow guide member to seal an air passage between the inner guide rib of the air flow guide member and the inner wall portion of the floating valve member.

A mounting protrusion may be provided on the outer guide rib of the air flow guide member, and a thread to be coupled to the mounting protrusion may be provided on an inner circumferential surface of the valve mounting member in a cup shape.

A frictional protrusion may be provided on an outer circumferential surface of the cup-shaped valve mounting member to allow the valve mounting member to be conveniently held and turned by hand when screw-coupled with the outer guide rib of the air flow guide member.

Effects of the Invention

According to the storage container for a vacuum blender with a backflow prevention function of the present disclosure configured as described above, fine food matters may be effectively prevented from flowing backward through the sealing cover of the storage container in the process of vacuuming the storage container or in the process of processing a food material after the vacuuming.

In addition, the backflow preventing unit installed in the sealing cover of the storage container includes the cup-shaped valve mounting member installed at a lower portion of the sealing cover and the floating valve member mounted in the valve mounting member, and here, a plurality of air inlet holes provided at the bottom of the valve mounting member are all located in the bottom surface of the floating valve member so that buoyancy generated as the fine food matters such as bubbles rise is guaranteed to act to raise the floating valve member. As a result, a phenomenon in which buoyancy due to the fine food matters is distributed and the fine food matters escape out of the sealing cover along the air passage before the floating valve member is raised may be effectively prevented.

In addition, the lower portion of the sealing cover of the storage container is provided with the air flow guide member having the inner guide rib and the outer guide rib provided at a predetermined interval, and the inner wall portion of the floating valve member is located between the inner guide rib and the outer guide rib, thereby bending the air passage to change a flow direction of air. As a result, time for the fine food matters to escape from the bent air passage is delayed, so that a phenomenon in which a portion of the fine food matters escape out of the sealing cover before the floating valve member is raised due to weak buoyancy that takes place at an initial stage in which the fine food matters rise may be more effectively prevented.

BRIEF DESCRIPTION OF THE DRAWINGS

The embodiments will be described in detail with reference to the following drawings in which like reference numerals refer to like elements wherein.

BEST MODE TO PRACTICE THE INVENTION

Figure 1:
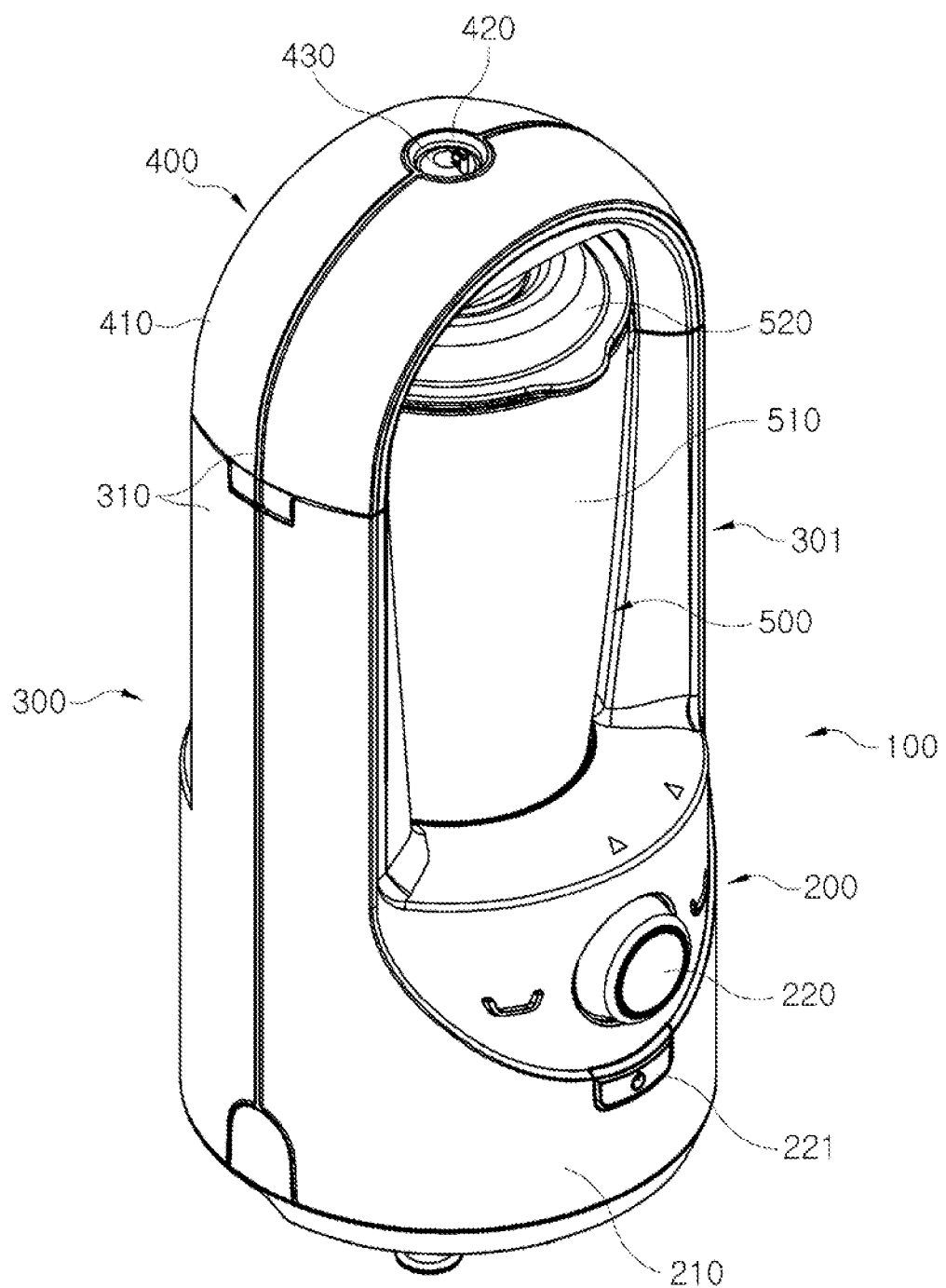
FIG. 1 is an overall perspective view of a vacuum blender according to the present disclosure.

Hereinafter, embodiments of the present disclosure will be described in detail with reference to the accompanying drawings.

These embodiments will be described sufficiently for a person skilled in the art to embody the present invention. It should be appreciated that various embodiments of the present invention may not be necessarily mutually exclusive. For example, particular shapes, structures, and characteristics in relation to one embodiment described herein may be implemented as a different embodiment without departing from the spirit and scope of the present invention.

Therefore, detailed descriptions hereinafter are not limitative and the scope of the present invention is intended to be embraced by the appended claims as well as all the equivalents of the claims. In the drawings, like reference numerals designate like elements throughout the specification.

Figure 2:
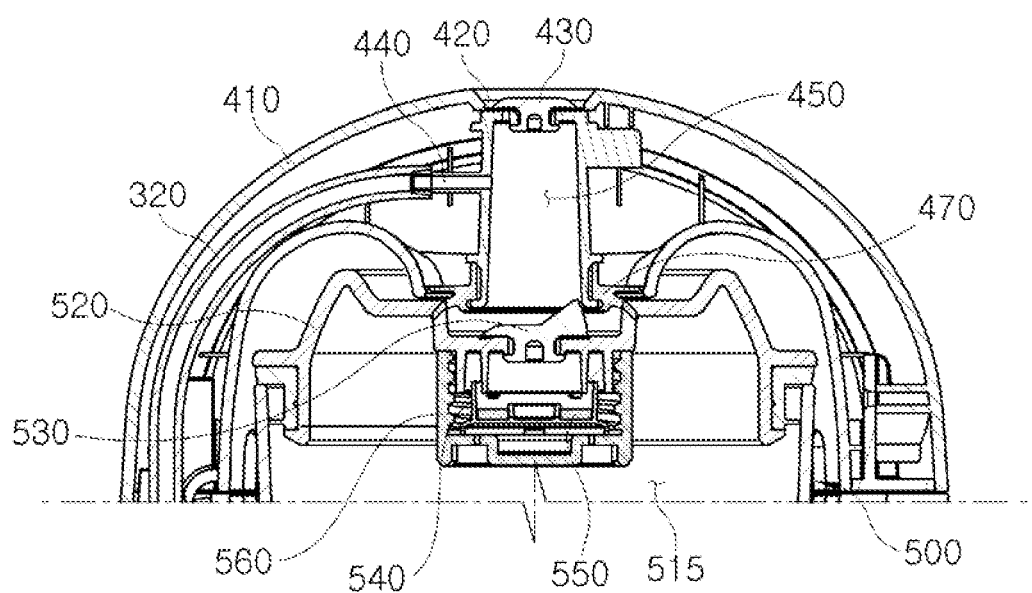
FIG. 2 is a partial cross-sectional view of a storage container for a vacuum blender according to the present disclosure.

FIG. 1 is an overall perspective view of a vacuum blender according to the present disclosure and FIG. 2 is a partial cross-sectional view of a storage container for a vacuum blender according to the present disclosure.

A vacuum blender 100 in which a storage container 500 of the present disclosure is used includes a mechanical operating part 200 in which mechanical parts for vacuuming and crushing are installed, a first support 300 and a second support 301 extending from the mechanical operating part 200 to a predetermined height to provide a space in which the storage container 500 is seated on the mechanical operating part 200, and a vacuum decompression part 400 horizontally extending from the first support 300 and having a component for vacuum decompression. Accordingly, a food material stored in the storage container 500 installed between the mechanical operating part 200 and the vacuum decompression part 400 may be crushed in a vacuum state.

The mechanical operating part 200 includes a main body 210 including an internal space and a vacuum pump (not shown) and a rotary motor (not shown) installed in the internal space of the main body 210. An operating button 220 and a power button 221 allowing a user to operate to perform various functions may be installed to be exposed to the outside of the main body. In addition, a seating surface may be provided at an upper end of the main body 210 so that the storage container 500 is placed thereon to interwork with the mechanical operating part 200. A vacuum tube 320 is connected to the vacuum pump, and the vacuum tube 320 is installed to extend to the vacuum decompression part 400 through the inside of the first support 300. To this end, the first support 300 has a space for accommodating at least the vacuum tube 320 therein. A pressure sensor (not shown) may be installed on the vacuum tube 320 to check a vacuum state in the vacuum tube 320.

The first support 300 is substantially vertically erected to have a predetermined height. As a result, a space in which the storage container 500 may be seated is provided between the vacuum decompression part 400 connected to an upper portion of the first support 300 and the seating surface of the mechanical operating part 200 as described above. In addition, the vacuum decompression part 400 may be rotatably coupled to an upper end of the first support 300 by a hinge 310. As a result, the vacuum decompression part 400 may move up and down based on the upper end of the support 300 as a rotation center, and thus, the storage container 500 may be more conveniently seated on the mechanical operating part 200, without being interfered with by the vacuum decompression part 400. The second support 301 may be provided on the opposite side of the position where the first support 300 is installed and have a predetermined height substantially in a vertical direction at the mechanical operating part 200. The second support 301 serves to support the vacuum decompression part 400 together with the first support 300.

A method of operating a vacuum blender according to the present disclosure will be briefly described. First, the storage container 500 according to the present disclosure is mounted on the main body 210 of the vacuum blender 100. Thereafter, when the vacuum decompression part 400 is rotated horizontally around the upper end of the first support 300, one end of the vacuum decompression part 400 is fixedly coupled to the second support 301. A vacuum chamber 450 communicating with the vacuum tube 320 through a connection nozzle 440 is provided in the body 410 of the vacuum decompression part 400. Upper and lower portions of the vacuum chamber 450 communicate with the outside of the body 410, and the upper portion of the vacuum chamber 450 is configured to be selectively opened and closed by a vacuum stopper 430 mounted in an accommodation recess 420. A lower portion of the vacuum chamber 450 is in close contact with an upper surface of a sealing cover 520 in which a check valve 530 is installed by a decompression part packing 470 so that the vacuum chamber 450 may be kept in a sealed state. The vacuum state of the vacuum chamber 450 may be simply released as the user simply lifts the vacuum stopper 430.

After the vacuum chamber 450 is formed as the vacuum decompression part 300 is mounted at an upper portion of the storage container 500, the user operates the vacuum pump (not shown) by pressing an operating button 220 of the mechanical operating part 200. When the vacuum pump is operated, the vacuum tube 320, the connection nozzle 440, the vacuum chamber 450, and the storage container 500 configuring one air passage are in a vacuum state. Since the check valve 530 of the sealing cover 520 allows only air to be discharged from the inside of the storage container 500 to the outside and prevents air from flowing into the storage container 500, vacuum is maintained after an internal space 515 is in the vacuum state according to an operation of the vacuum pump.

Thereafter, the user may process a food material stored in the storage container 500 by operating the operation button 220 of the mechanical operating part 200 or may form vacuum again to store the processed food material. Here, a phenomenon in which fine food matters stored in the storage container 500 rise and flow backward through the check valve 530 installed at the sealing cover 520 may occur. The fine food matters may enter the inside of the vacuum pump along the vacuum tube 320 and cause the vacuum pump to fail. In order to prevent the fine food matters from flowing backward, the present disclosure provides a backflow preventing unit at the storage container 500. Hereinafter, the backflow preventing unit will be described in detail.

Figure 3:
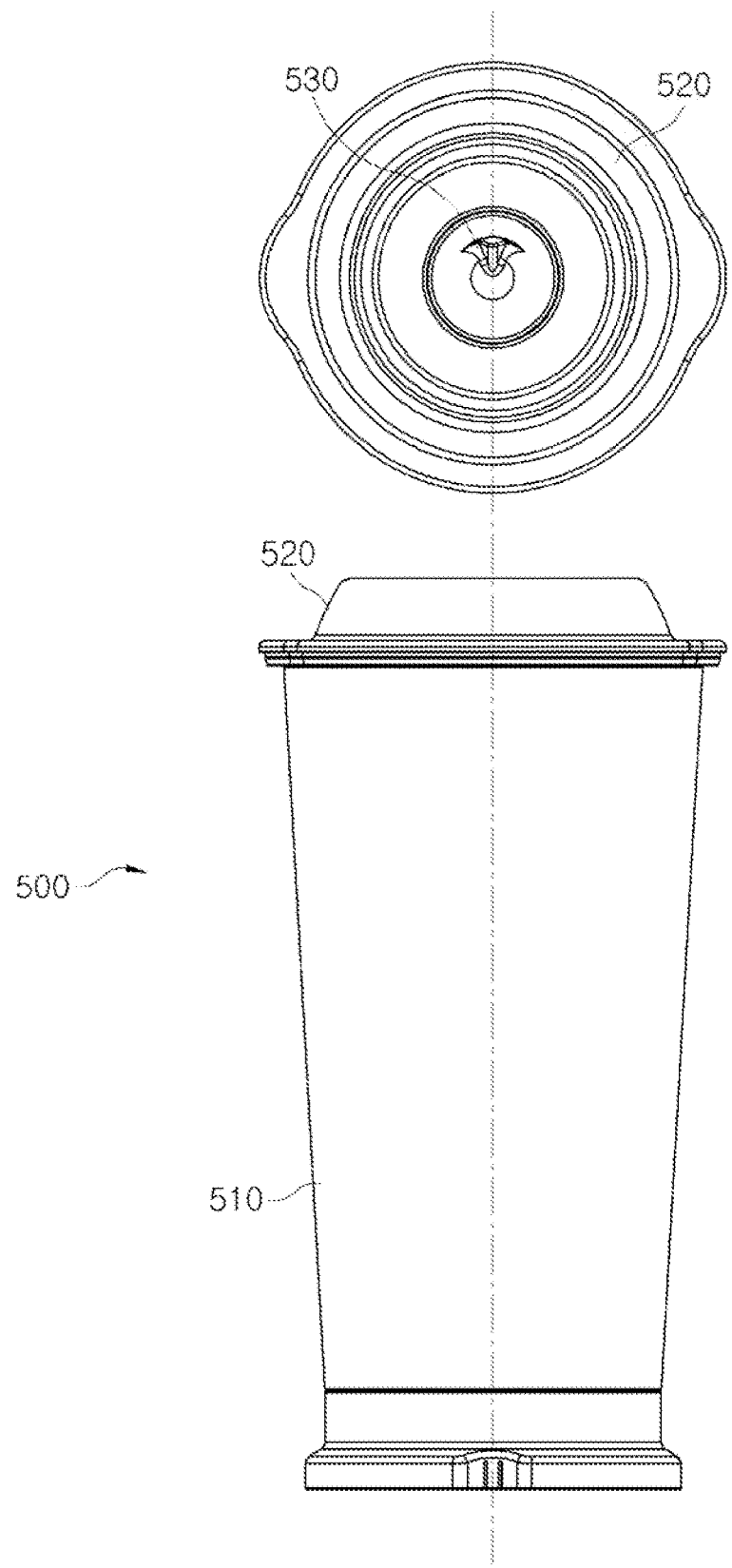
FIG. 3 is a view showing a storage container for a vacuum blender according to the present disclosure.

FIG. 3 is a view showing an outer shape of the storage container 500 with a backflow prevention function according to the present disclosure. The storage container 500 of the present disclosure is basically a storage container used in a vacuum blender that allows a food material to be processed in a vacuum state. The storage container 500 includes a container main body 510 opened in an upper portion and having an internal space 515 to hold a food material and a sealing cover 520 covering the upper portion of the container main body 510 and having a check valve 530 for preventing air from flowing into the internal space 515 from the outside of the container main body 510 in a state where vacuum is formed. The storage container 500 according to the present disclosure may be a container having blades for processing therein or may be an auxiliary container used for simple storage without a blade.

Figure 4:
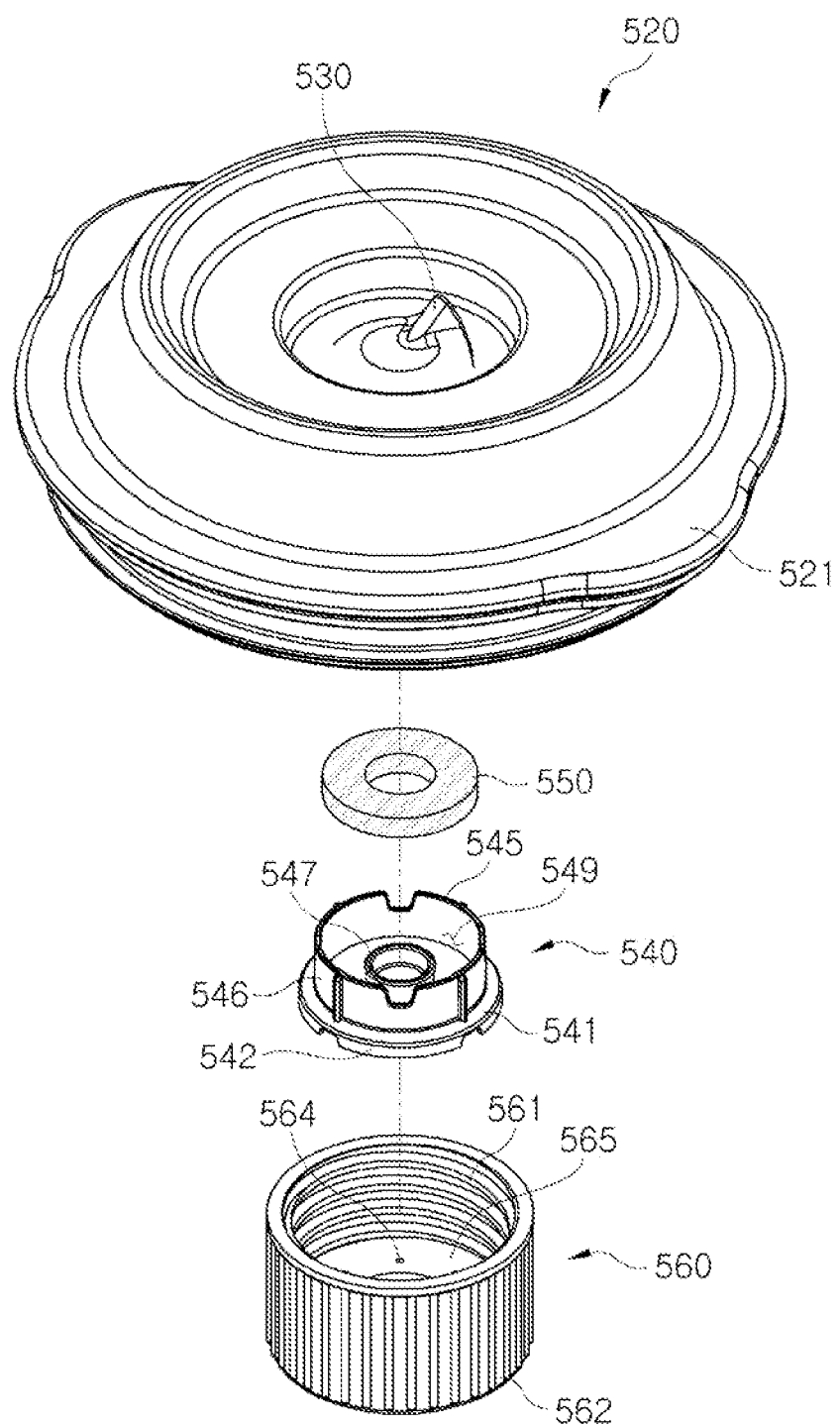
FIG. 4 is an exploded perspective view showing a backflow prevention unit according to the present disclosure.
Figure 5:
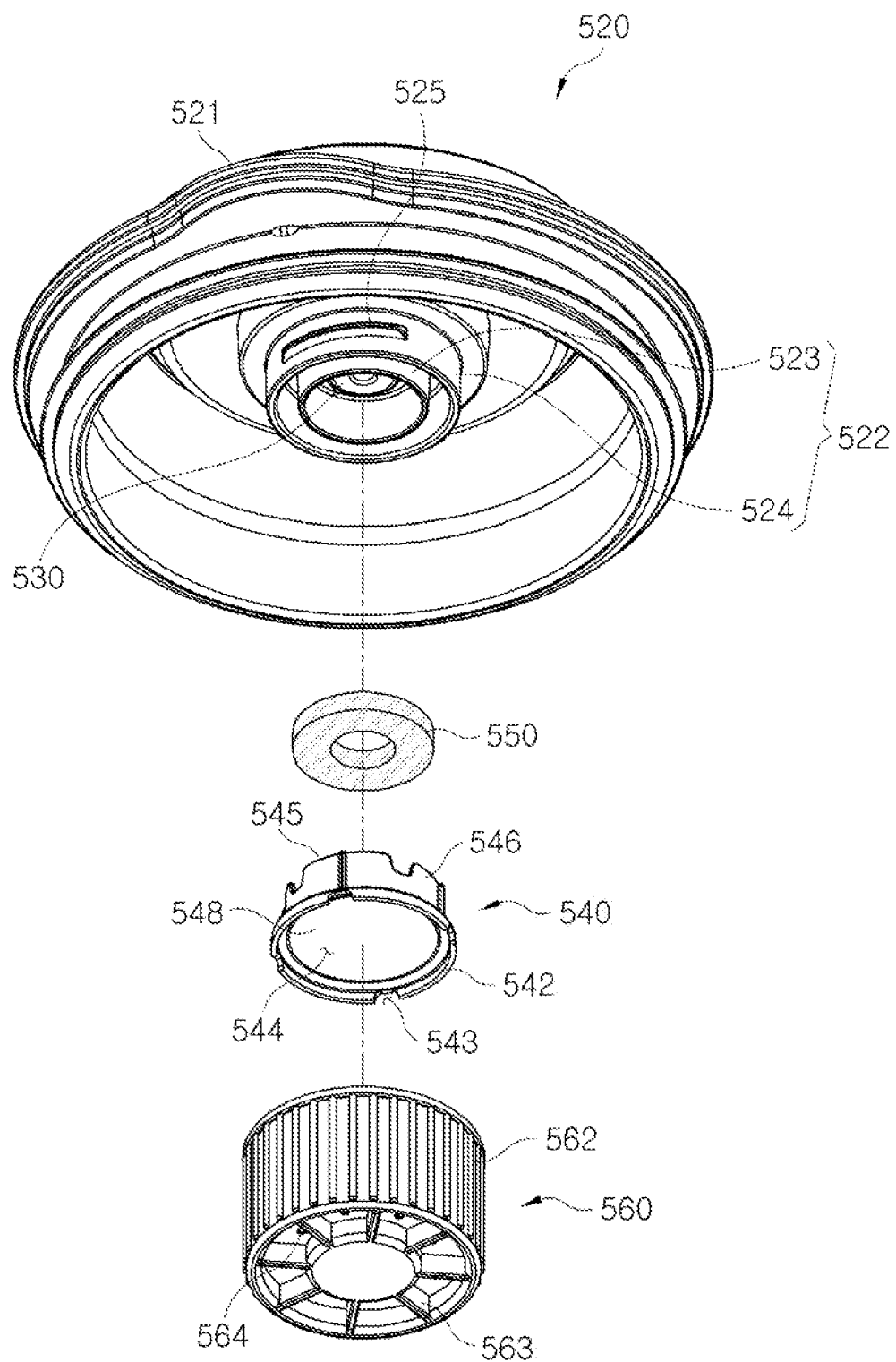
FIG. 5 is a bottom exploded perspective view showing a backflow prevention unit according to the present disclosure.

The backflow preventing unit according to the present disclosure is installed at a lower portion of the sealing cover 520. FIG. 4 is an exploded perspective view showing a backflow preventing unit according to the present disclosure and FIG. 5 is a bottom exploded perspective view showing a backflow preventing unit according to the present disclosure.

The backflow preventing unit of the present disclosure includes a floating valve member 540 installed at a lower portion of the sealing cover 520 and raised together by buoyancy when the fine food matters rise to thereby seal the air passage, whereby the fine food matters are prevented from flowing backward to the outside of the sealing cover 520 through the check valve 530.

In more detail, in the backflow preventing unit, a valve mounting member 560 having a cup shape with an open upper portion, allowing the floating valve member 540 to be installed to be movable up and down therein, and having a plurality of air inlet holes 564 provided on a bottom 565 thereof is detachably coupled to a lower portion of the sealing cover 520. In addition, the floating valve member 540 includes a lower end buoyancy operating portion 541 allowing buoyancy generated by the fine food matters introduced through the air inlet holes 564 formed on the bottom 565 of the valve mounting member 560 to act and an upper end valve portion 545 extending upward from the lower end buoyancy operating portion 541 and having a valve packing 550 inserted therein.

The lower end buoyancy operating portion 541 of the floating valve member 540 has a rim portion 542 having a predetermined thickness along a circumference thereof, and when the rim portion 542 comes into contact with the bottom 565 of the valve mounting member 560, a buoyancy acting space 544 is formed between a ceiling 548 of the lower end buoyancy operating portion 541 and the bottom 565 of the valve mounting member 560. When the buoyancy acting space 544 is filled with the fine food matters such as bubbles, buoyancy acts to raise the floating valve member 540.

Here, all the air inlet holes 564 formed at the bottom 565 of the valve mounting member 560 may be located on an inner side of the rim portion 542 of the floating valve member 540. If some of the air inlet holes 564 are located on an outer side of the rim portion 542, the fine food matters passing through the air inlet holes 564 may not be used for generating buoyancy to raise the floating valve member 540 but escape toward the check valve 530 of the sealing cover 520. As a result, a portion of the fine food matters may pass through the check valve 530 and flow backward before floating valve member 540 is raised by buoyancy to seal the air passage.

In the embodiment of the present disclosure as described above, all the air inlet holes 564 formed at the bottom 565 of the valve mounting member 560 are located on the inner side of the rim portion 542 of the floating valve member 540, that is, in the buoyancy acting space 544 formed by the rim portion 542. As a result, all the fine food matters passing through the air inlet holes 564 are used to apply buoyancy to the floating valve member 540, and thus, the floating valve member 540 may rise as fast as possible, while the fine food matters rise, to thereby seal the air passage.

The rim portion 542 of the floating valve member 540 is provided with an air outlet hole 543 to discharge air, which flows into the buoyancy acting space 544 through the air inlet hole 564 of the valve mounting member 560, to the inside of the cup of the valve mounting member 560. As a result, the air passage including the air inlet hole 564 formed at the bottom 565 of the valve mounting member 560, the buoyancy acting space 544 provided at the lower end buoyancy operating portion 541 of the floating valve member 540, the air outlet hole 543 provided at the rim portion 542 of the floating valve member 540, and the inside of the cup of the valve mounting member 560 is formed.

Meanwhile, the upper end valve portion 545 of the floating valve member 540 includes an inner wall portion 546 having a predetermined height formed along the circumference, the valve packing 550 is inserted in an internal mounting space 549 formed by the inner wall portion 546, and the inner wall portion 546 is configured to move along an air flow guide member 522 formed at a lower end of the sealing cover 520.

The upper end valve portion 545 of the floating valve member 540 includes a mounting protrusion 547 formed at the inner mounting space 549 formed by the inner wall portion 546, and the valve packing 550 may be inserted and coupled to the mounting protrusion 547. As a result, when the fine food matters such as bubbles rise as described above, if the floating valve member 540 rises together by buoyancy, the upper end valve portion 545, and specifically, the valve packing 550 inserted in the internal mounting space 549 of the upper end valve portion 545, is in close contact with a lower surface of the sealing cover 520, thereby sealing the air passage toward the check valve 530. In detail, as the valve packing 550 mounted at the upper end valve portion 545 is in close contact with the air flow guide member 522 provided at the lower surface of the sealing cover 520, thereby sealing the air passage toward the check valve 530.

The air flow guide member 522 includes an inner guide rib 523 and an outer guide rib 524 formed at a predetermined interval therebetween, and the inner wall portion 546 of the floating valve member 540 is located between the inner guide rib 523 and the outer guide rib 524 to thereby change a flow direction of air. As a result, the air discharged through the air outlet hole 543 formed at the lower end buoyancy operating part 541 of the floating valve member 540 moves toward the check valve 530 after passing through the air passage bent along the air flow guide member 522, rather than immediately escaping toward the check valve 530 of the sealing cover 520.

Therefore, even after the fine food matters such as bubbles pass through the air outlet hole 543 of the floating valve member 540, time is delayed while the fine food matters pass through the bent air passage formed by the air flow guide member 522. Accordingly, a phenomenon in which a portion of the fine food matters which first rises passes through the check valve 530 to flow backward before the floating valve member 540 is not raised yet when the fine food matters rise is prevented in advance.

According to an embodiment of the present disclosure, the air flow guide member 522 may be configured such that air discharged through the air outlet hole 543 of the lower end buoyancy operating portion 541 of the floating valve member 540 rises through the air passage between the inner wall portion 546 of the floating valve member 540 and the outer guide rib 524 of the air flow guide member 522, and the rising air drops again through the air passage between the inner guide rib 523 of the air flow guide member 522 and the inner wall portion 546 of the floating valve member 540. As such, the air passage bent at 180° serves to delay the flow of air.

Meanwhile, the valve packing 550 inserted and installed in the upper end valve portion 545 of the floating valve member 540 may be configured to be in contact with the inner guide rib 523 of the air flow guide member 522 to seal the air passage between the inner guide rib 523 of the air flow guide member 522 and the inner wall portion 546 of the floating valve member 540. As a result, the valve packing 550 blocks the air passage at a position closest to the check valve 530, that is, a position farthest from the air outlet hole 543 of the floating valve member 540. Thus, even if fine food matters such as bubbles pass through the air outlet hole 543 of the floating valve member 540, the floating valve member 540 is raised by buoyancy to seal the air passage, while the fine food matters pass through the bent air passage of the air flow guide member 522. Accordingly, a phenomenon in which the fine food matters, which first rise, flow backward through the check valve 530 before the floating valve member 540 is raised by sufficient buoyancy is effectively prevented.

The basic technical concept of the present disclosure is to prevent the fine food matters such as bubbles from flowing backward through the check valve 530 by automatically blocking the air passage by buoyancy of the fine food matters acting on the floating valve member 540 when the fine food matters rise in the vacuum process. However, according to results of several experiments, the inventor of the present application found a problem that the fine food matters, which first rise, flow backward through the check valve 530 before the fine food matters generate sufficient buoyancy for the floating valve member 540 to be raised because air in the storage container 500 escapes out at a very high speed due to vacuum pressure. As described above, in order to solve the problem, the inventor of the present application added two technical configurations.

First, all the air inlet holes 564 formed at the bottom 565 of the valve mounting member 560 are located on the inner side of the rim portion 542 of the floating valve member 540, that is, inside the buoyancy acting space 544 formed by the rim portion 542, whereby the floating valve member 540 may also be raised together as quickly as possible to seal the air passage, while the fine food matters rise.

Second, the air flow guide member 522 includes the inner guide rib 523 and an outer guide rib 524 formed at a predetermined interval therebetween, and the inner wall portion 546 of the floating valve member 540 is located between the inner guide rib 523 and the outer guide rib 524 to bend a flow direction of air. As a result, even after the fine food matters such as bubbles pass through the air outlet hole 543 of the floating valve member 540, a time is delayed while the fine food matters pass through the bent air passage formed by the air flow guide member 522, whereby a portion of the fine food matters, which first rises, is effectively prevented from flowing backward through the check valve 530 before the flowing valve member 540 is not raised yet while the fine food matters rise.

Meanwhile, a mounting guide 525 may be provided at the outer guide rib 524 of the air flow guide member 522 and a thread 561 to be coupled to the mounting protrusion 525 is provided on an inner circumferential surface of the cup-shaped valve mounting member 560, so that both members may be firmly screw-coupled. In addition, a frictional protrusion 562 may be provided on an outer circumferential surface of the cup-shaped valve mounting member 560 so that the valve mounting member 560 may be conveniently held and turned by hand when the valve mounting member 560 is screw-coupled with the outer guide rib 524 of the air flow guide member 522.

Hereinafter, the operation of the storage container for a vacuum blender with a backflow prevention function according to the present disclosure will be described briefly with reference to FIGS. 6 and 7.

Figure 6:
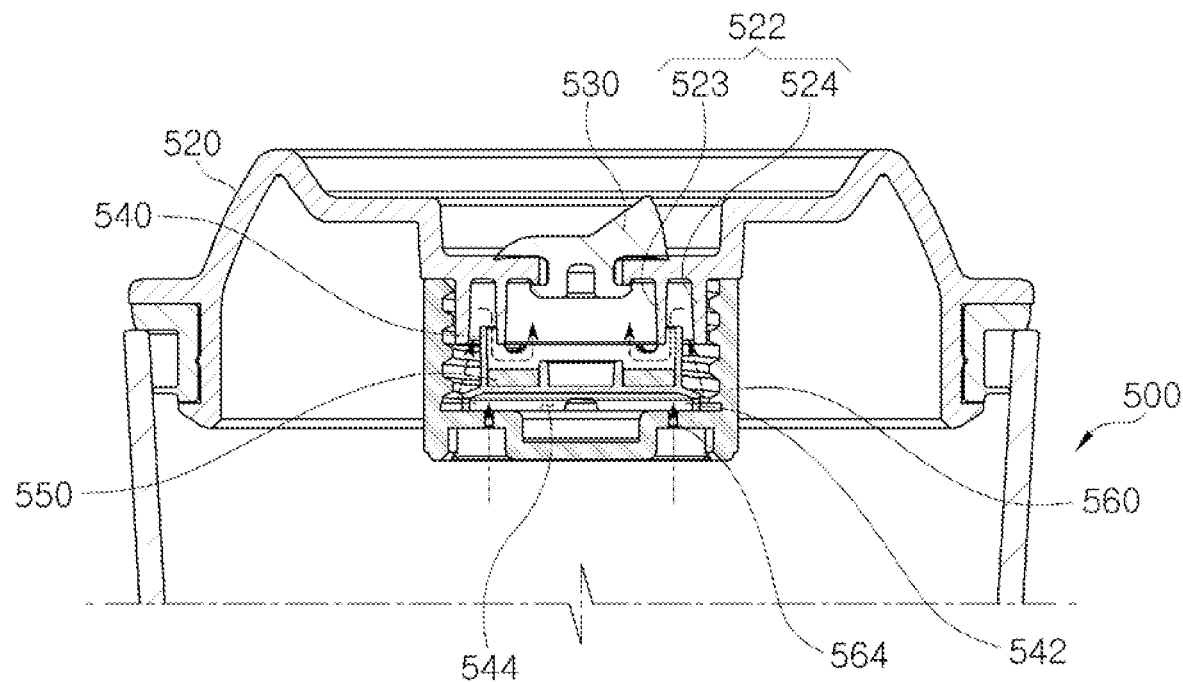
FIG. 6 is a view showing a state before a floating valve member is raised according to the present disclosure.

First, FIG. 6 shows an air flow in a normal case where fine food matters such as bubbles do not rise. When the storage container 500 is mounted on the main body of the vacuum blender and the vacuum pump is operated, air in the storage container 500 flows into the buoyancy acting space 544 of the valve member 540 through the plurality of air inlet holes 564 formed at the bottom of the valve mounting member 560.

However, only the force of the introduced air cannot raise the floating valve member 540 up. To this end, it is necessary to appropriately adjust a load of the floating valve member 540 and the valve packing 550 mounted therein. In other words, a total load of the floating valve member 540 needs to be adjusted such that the floating valve member 540 is not raised by pressure applied by air flowing in by vacuum pressure but raised by buoyancy generated by the fine food matters such as bubbles as shown in FIG. 7.

The air introduced into the buoyancy acting space 544 of the floating valve member 540 is discharged into the valve mounting member 560 through the air outlet hole 543 formed at the rim portion 542. The discharged air rises along the inner circumferential surface of the cup-shaped valve mounting member 560, passes through the air flow guide member 522, and finally passes through the check valve 530 of the sealing cover 520 so as to be discharged toward the vacuum pump.

Figure 7:
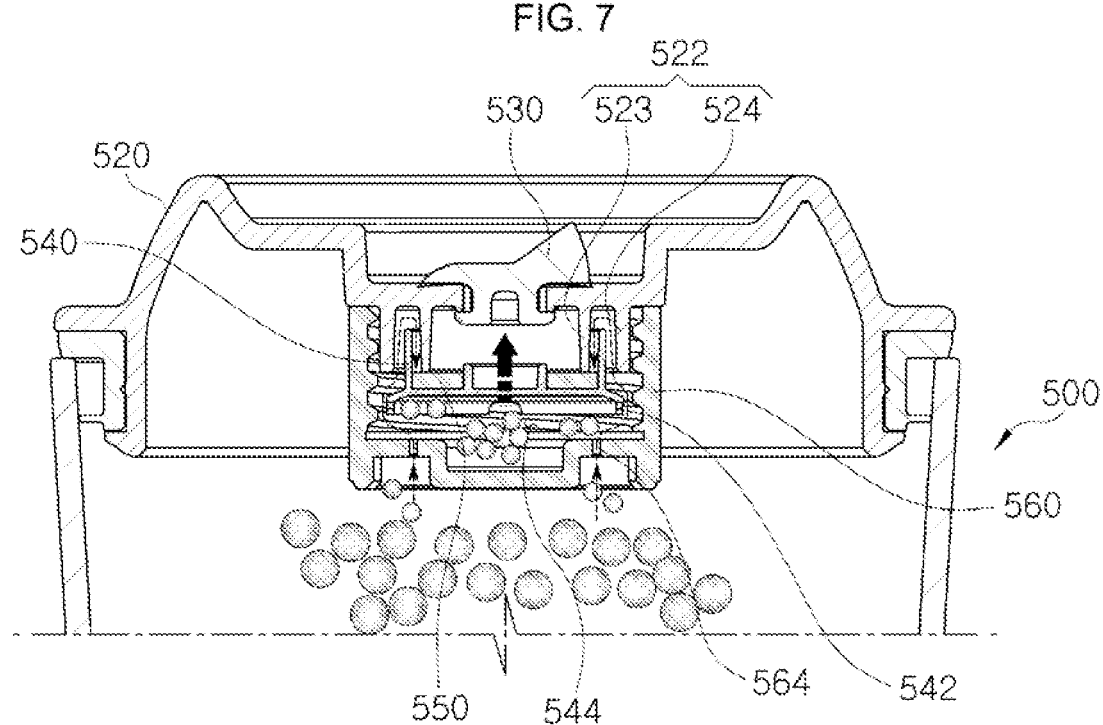
FIG. 7 is a view showing a state after the floating valve member is raised according to the present disclosure.

Meanwhile, FIG. 7 shows an air flow in a case where the fine food matters such as bubbles rise. When the storage container 500 is mounted on the main body of the vacuum blender and the vacuum pump is operated, the fine food matters in the storage container flow into the buoyancy acting space 544 of the floating valve member 540 through the plurality of air inlet holes 564 provided at the bottom of the valve mounting member 560 together with air.

The fine food matters generate buoyancy to cause the floating valve member 540 to be raised upward. To this end, a total load of the floating valve member 540 needs to be adjusted such that the floating valve member 540 is not raised by pressure applied by air flowing in by vacuum pressure but raised by buoyancy generated by the fine food matters such as bubbles as described above.

The fine food matters introduced into the buoyancy acting space 544 of the floating valve member 540 is discharged into the valve mounting member 560 through the air outlet hole 543 formed at the rim portion 541. The discharged fine food matters rise along the inner circumferential surface of the cup-shaped valve mounting member 560 and pass through the bent air passage of the air flow guide member 522, during which the floating valve member 540 is raised to seal the air passage. When the floating valve member 540 is raised, the inner wall portion 546 of the upper end valve portion 525 rises between the inner guide rib 523 and the outer guide rib 524 configuring the air flow guide member 522, and thus, the bent air passage becomes relatively longer. As a result, the fine food matters cannot pass through the check valve 530 as the air passage is sealed, a backflow phenomenon may be prevented in advance.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fail within the scope and spirit of the invention.

The invention claimed is:

1. A storage container used in a vacuum blender for processing a food material in a vacuum state, the storage container comprising:
   a container main body having an open upper portion and having an internal space for holding the food material;
   a sealing cover covering the upper portion of the container main body and having a check valve installed to block air flowing from outside of the container main body to the internal space in a state where vacuum is formed; and
   a backflow preventing unit installed at a lower portion of the sealing cover and including a floating valve member raised together by buoyancy when fine food matters rise to seal an air passage to prevent the fine food matters from flowing backward to the outside of the sealing cover through the check valve, wherein
   the backflow preventing unit is provided such that a valve mounting member having a cup shape with an open upper portion, allowing the floating valve member to be installed to be movable up and down therein, and having a plurality of air inlet holes provided on a bottom thereof is detachably coupled to the lower portion of the sealing cover, and
   the floating valve member comprises a lower end buoyancy acting portion allowing buoyancy generated by the fine food matters flowing in through the air inlet holes provided at the bottom of the valve mounting member to act and an upper end valve portion extending upward from the lower end buoyancy acting portion and allowing a valve packing to be inserted and installed therein, and wherein
   the lower end buoyancy acting portion of the floating valve member has a rim portion provided along a circumference thereof and having a predetermined thickness, the rim portion is in contact with a bottom of the valve mounting member to form a buoyancy acting space between the lower end buoyance acting portion and the bottom of the valve mounting member, all air inlet holes provided at the bottom of the valve mounting member are located on an inner side of the rim portion, and the rim portion has an air outlet hole allowing air flowing into the buoyancy acting space through the air inlet hole to be discharged to an inside of the cup of the valve mounting member.

2. The storage container of claim 1, wherein
   the upper end valve portion of the floating valve member has an inner wall portion having a predetermined height along a circumference thereof, the valve packing is inserted and installed in an internal mounting space formed by the inner wall portion, and the inner wall portion moves along an air flow guide member provided at a lower end of the sealing cover.

3. The storage container of claim 2, wherein,
   the upper end valve portion of the floating valve member has a mounting protrusion provided in the internal mounting space formed by the inner wall portion, and the valve packing is inserted and coupled to the mounting protrusion so as to be fixed.

4. The storage container of claim 2, wherein
   the air flow guide member includes an inner guide rib and an outer guide rib formed at a predetermined interval therebetween, and the inner wall portion of the floating valve member is located between the inner guide rib and the outer guide rib to change a flow direction of air.

5. The storage container of claim 4, wherein
   the air flow guide member is configured to allow air discharged through the air outlet hole of the lower end buoyancy acting portion of the floating valve member to rise through an air passage between the inner wall portion of the floating valve member and the outer guide rib of the air flow guide member, and the rising air drops again through the air passage between the inner guide rib of the air flow guide member and the inner wall portion of the floating valve member.

6. The storage container of claim 4, wherein
   the valve packing inserted and installed in the upper end valve portion of the floating valve member is brought into contact with the inner guide rib of the air flow guide member to seal an air passage between the inner guide rib of the air flow guide member and the inner wall portion of the floating valve member.

7. The storage container of claim 4, wherein
   a mounting protrusion is provided on the outer guide rib of the air flow guide member, and a thread to be coupled to the mounting protrusion is provided on an inner circumferential surface of the valve mounting member in a cup shape.

8. The storage container of claim 7, wherein
   a frictional protrusion is provided on an outer circumferential surface of the cup-shaped valve mounting member to allow the valve mounting member to be conveniently held and turned by hand when screw-coupled with the outer guide rib of the air flow guide member.

* * * * *